Jan. 23, 1923.
M. N. CORMACK.
LINING-UP MACHINE FOR PRINTERS.
FILED DEC. 24, 1919.
1,442,860
4 SHEETS-SHEET 4
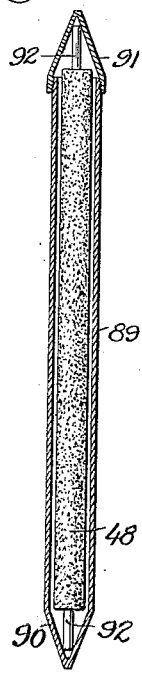
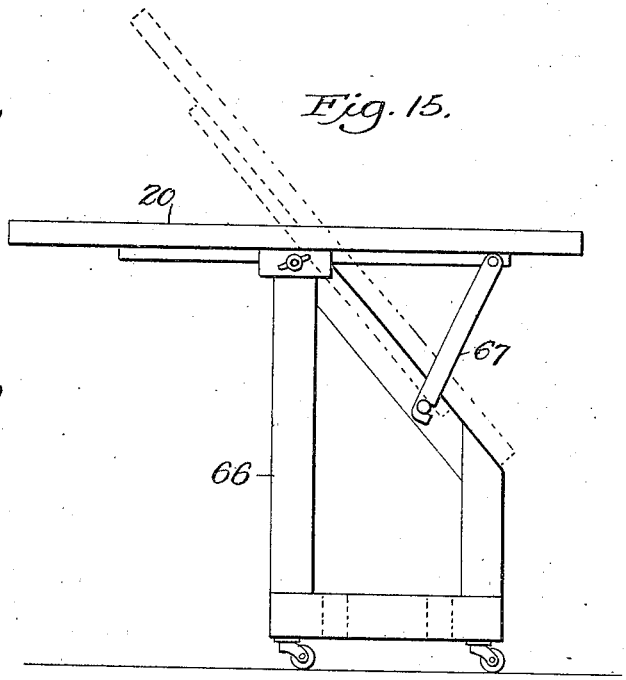
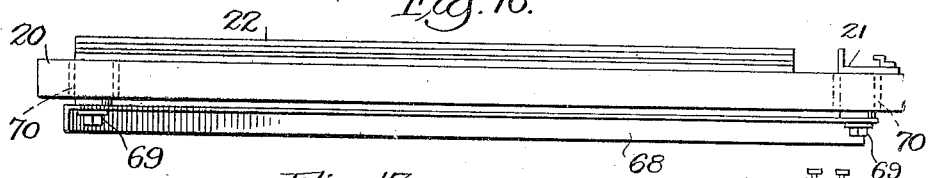
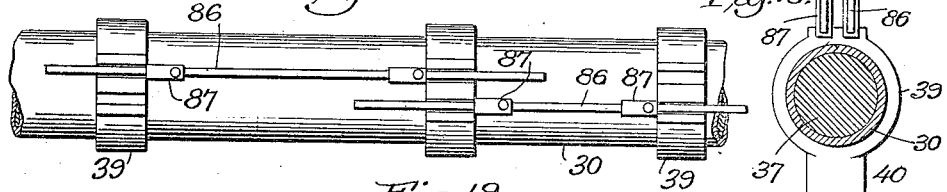
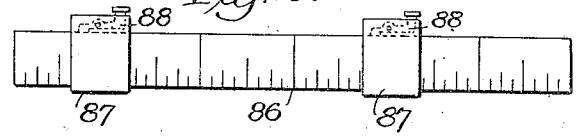
INVENTOR,
Mark N. Cormack,
BY
James F. Duhamel,
ATTORNEY Patented Jan. 23, 1923.

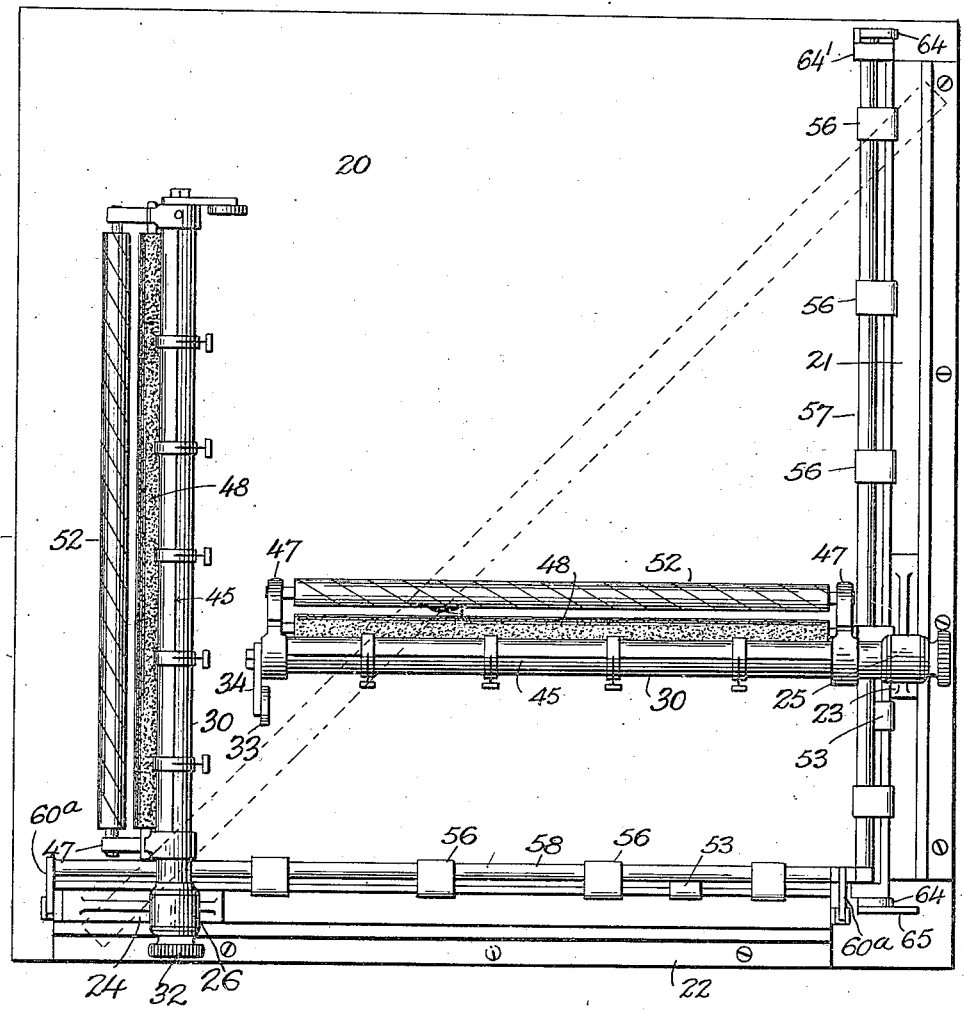
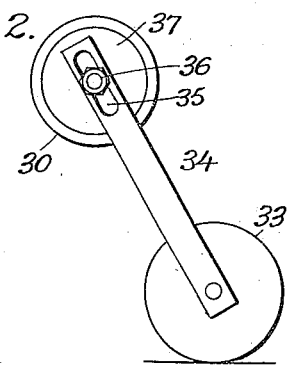

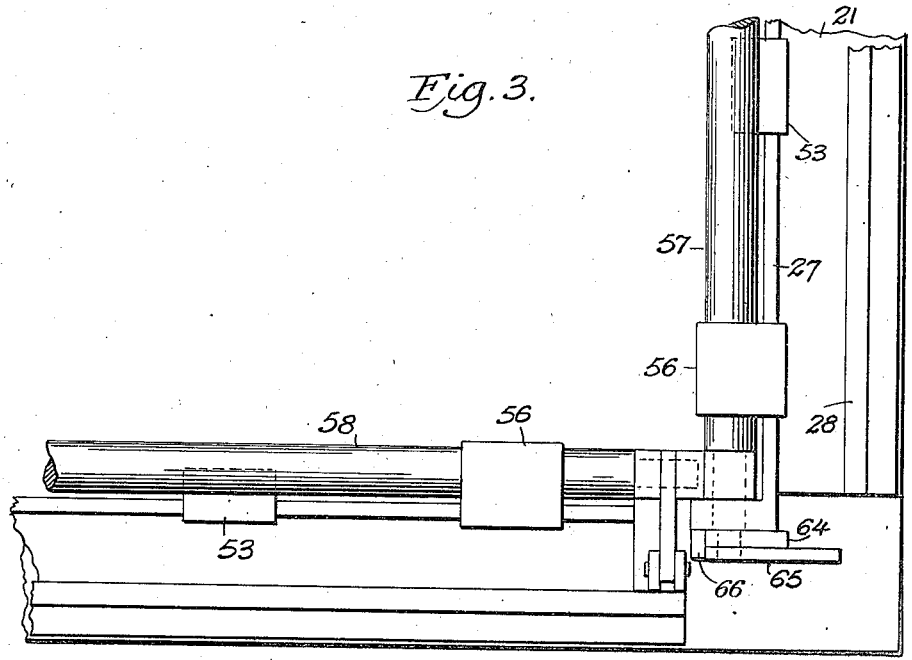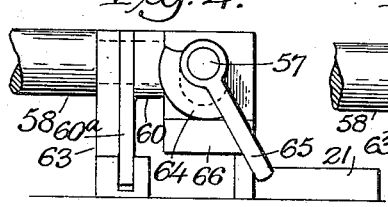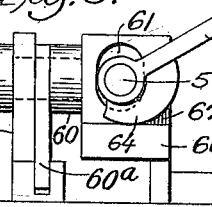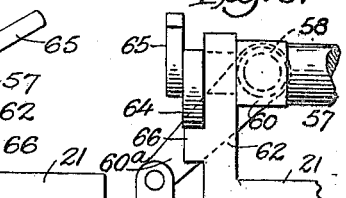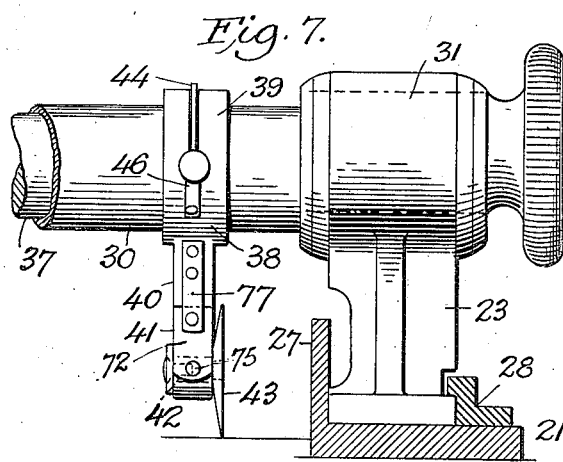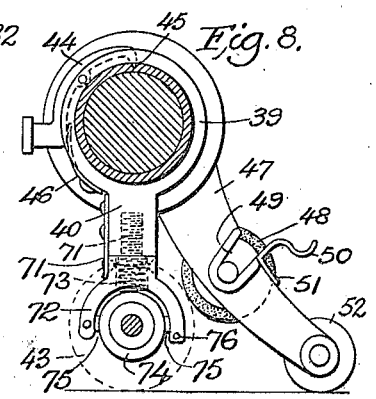

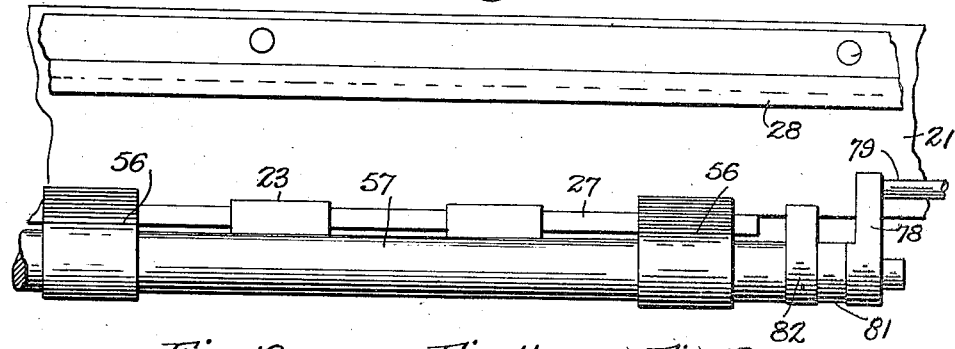
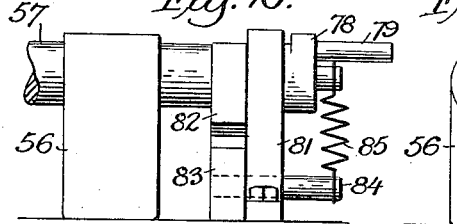
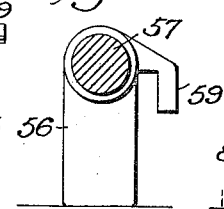
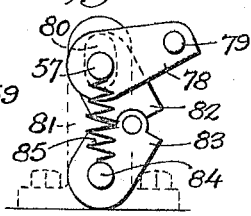
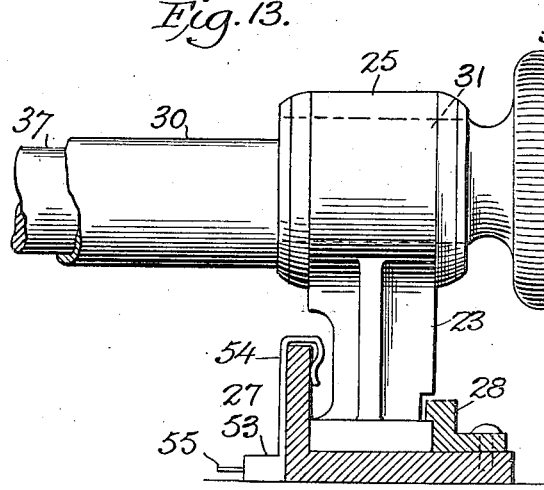
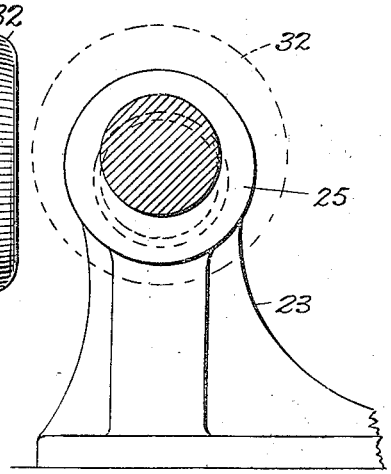

1,442,860

UNITED STATES PATENT OFFICE.

MARK N. CORMACK, OF BROOKLYN, NEW YORK.

LINING-UP MACHINE FOR PRINTERS.

Application filed December 24, 1919. Serial No. 347,066.

*To all whom it may concern:*

Be it known that I, MARK N. CORMACK, a citizen of the United States, residing at Brooklyn, Kings County, New York, have invented certain new and useful Improvements in Lining-Up Machines for Printers, of which the following is a specification.

This invention relates to paper line-up machines and is to afford printers a means to register on the back of a sheet having a plurality of printed pages, indicating lines to enable the pressmen to gauge and feed said sheet or sheets into the press with no delay.

The device consists of bars carrying reversible marking wheels that are movable at right angles to each other and rotatable so that the wheels may be lifted while being relocated and gauges and clamps are provided along two sides of the table to locate and hold the sheet of paper, while a smoothing roller is provided to smooth the paper before the advancing wheels.

The object of the invention is to provide an apparatus for making strike sheets, and producing a correctly marked outline around each subject to determine its exact position, practically securing the "key form" on paper before the printing form is imposed or made up, the said printing form being made up by a sheet ruled in this manner.

The improvements consist of details not heretofore used and comprise markers having a set position for operation, reversible markers which may be brought together for a single line, gauges and clamps adjustable to any position and synchronous in operation, the printing of both sides of the sheet identically, the arrangement of all the parts above the table, portability and lightness of construction, markers that will not mar and mutilate the sheet, the stiffening of the carrying shaft, so that the markers work in unison, a smoothing roller that works away from the corner where the paper is held and other details and objects which are more fully described in the following specification, set forth in the appended claims and illustrated in the accompanying drawings, wherein:

Fig. 1 is a plan view of the improved liner.

Fig. 2 is a view of the end supporting roller for the marker shaft.

Fig. 3 is a plan view of one corner of the table.

Figs. 4 and 5 are end elevations of the clamp operators,

Fig. 6, is a side view of the same,

Fig. 7, is a side view of one end of the marker bar and its bearing,

Fig. 8, is a cross sectional view of the same,

Figs. 9, 10, 11 and 12 are views of a modified form of clamping means,

Fig. 13, shows a sectional view through the rail for the marker bar.

Fig. 14 shows an end elevation of the shaft and bearing without the knob,

Fig. 15 is a side elevation of the table and carriage,

Fig. 16 is a side view of the table showing its brace,

Figs. 17, 18 and 19, show means for setting the markers,

Fig. 20 shows how the inking roller may be removed and stored to prevent evaporation of the ink.

The machine consists of the table 20 adapted to be perfectly smooth on its upper surface and thoroughly rigid and having at two adjacent sides rails 21 and 22 along which are adapted to move the bases 23 and 24 of journal bearings 25 and 26, each being held on the rails by similar flanges 27 and guides 28. One end of each base is elongated in the direction of operation of the markers 43 and while the flange 27 is integral with the rail, the guide 28 is secured thereto after the base 23 is located, and prevents the release of the latter, and the whole is attached to the side of the table.

The bearings 25 and 26 and their accessories are identical and their functions the same, and they control the marking of a sheet with lines at a right angle to each other while each bearing, 25 or 26, carries a shaft 30 with an eccentric 31 where it is supported in said bearing and having a manipulating knob 32 outside of the bearing to move the latter and shaft along its respective rail or to rotate the shaft in the bearing.

While one end of the shaft is thus supported the other end rests upon a roller 33 and upon which it is practically pivoted by means of an adjustable arm 34 having a slot 35 through which passes a binding bolt 36 to rigidly secure it to the shaft at any height from the table or any angle thereto that may be desired.

The shaft 30 is a tube of thin metal and filled with a core 37 of light but tough wood so that while light in construction, and notwithstanding its length, the tube will be rigid and true. It is very necessary that the bar does not sag nor that it is not too heavy as it would force the markers into the sheets along certain lines and cut and destroy the sheet at those points. This light construction also allows the shaft and markers to be easily run over the sheets while the bearing base 23 slides over the rail.

Each shaft 30 carries an appropriate number of markers which are best shown in detail in Figs. 7 and 8 and consists of a ring 39 to encircle the shaft and having a stem 40 with a socket at its outer end into which is screwed a threaded spindle 71 of a reversible block 41 that carries the shaft 42 of the marking wheel 43. This wheel has a sharp edge adapted to make lines on the paper to be marked and it is reversible with its carrying block so that it may act independently or thrown around flush with an adjacent wheel so they will both mark a single line.

Each ring 39 is slitted about a quarter of its circumference and in this slit is pivoted a lever 44 that is a detent whose toothed end 45 fits into a groove running the length of the shaft 30 and locks the marker thereon.

A spring 46 presses the outer or knobbed end of the lever 44 upward to keep the point 45 engaged.

The block 41 is formed with a yoke 72 at its lower end and is secured to the stem 40 by the spindle 71 and carries in a socket the spring 73 that presses upon the hub 74 of the wheel 43, the said hub having trunnions 75 at each side, one being pivoted to a branch of the yoke while the other trunnion is supported by a pin 76 in the other arm so that the wheel is resilient and readily yields to uneven paper or table.

To retain the yoke in its reversed position a flat spring 77 having a stud in its outer end to fit a socket in either side of the yoke and hold same in whatever position it is turned is secured to the block 40.

The shaft 30 also carries brackets 47 at each end, as shown in Fig. 1 and in detail in Fig. 8, and these brackets carry the inking roller 48 that impinges the edges of the marking wheels 43 and supplies them with the ink to be impressed on the paper and just before they make contact therewith, and, as shown in Fig. 8, the shaft of the ink roller is dropped into a slot in the brackets and plays loosely therein so that it bears upon the wheels by gravity only. To render the machine inoperative the rollers may be removed from the slots 49 and the shaft lodged in the depressions 50 of the arms 51 that extend from the side of the bracket. The rollers 48 may be covered with felt and saturated with liquid ink but any other type of inking roller may be substituted.

In the lower end of the brackets 47 is journalled a pressing and smoothing roller 52 having a spiral groove cut into its outer surface and the trend of this groove on the under side of the roller, where it makes contact with the paper on the table, is at an acute angle to that side of the table whence it is moving so that there is a tendance to grip the paper and force it, though slightly, towards the free corner diagonally opposite the corner where the rails 21 and 22 meet.

Both of these shafts 30 at each of the two sides of the machine are identical but operated on separate occasions and while one is in use, the idle shaft is at the extreme outer end of its rail.

The paper to receive the necessary lining is placed on the table, the shafts 30 turned on their eccentrics 31 and rollers 33 elevate the ends of bracket 47 and remove the marking wheels 43 from the table, so that the sheet may be spread and its lower right hand corner drawn into place so that its lower and right sides rest against gauges 53, that have clamping extensions 54 fitting over and securing them to the flanges 27 as best shown in Fig. 13, and the edges then rest beneath lateral pins 55 so that they will not ride up against the gauges. The paper is now secured for the marking operation by a series of clamps 56 mounted on rods 57 and 58 parallel with the rails 21 and 22 and as shown in Fig. 11, these clamps have jaws 59 that are adapted to fit over the flange 27.

The rods 57 and 58 are identical and the adjacent reduced ends of the same are carried in a block 60 although at right angles to each other and as shown in Figs. 3, 4, 5 and 6, and where it will also be seen that the end of the rod 57 also plays through the slot 61 in an upright 62 while a similar adjacent upright 63 carries the reduced end of the rod 58. Rod 57 at its extreme end carries a cam 64 with a handle 65 and the cam 64 operates on a ledge 66 of upright 62 to raise and lower the rod and the block 60, when a new sheet of paper is to be secured to the table. The clamps 56 are raised when the cam occupies the position shown in Fig. 4 and lowered when thrown to the position illustrated in Figs. 5 and 6.

In order to prevent the dislocation of rod 58 a diagonal arm 60$^a$ is pivoted to the table and the reduced end of said rod passes through a slotted opening in the arm at its upper end, and shown in dotted lines in Fig. 6, to allow a slight vertical movement of the block 60 with the ends of the rods and which will be abundant for the insertion of the paper under the clamps.

Where the reduced end of rod 58 passes through the upright 63 and the arm 60ᵃ, the latter is slotted or has an enlarged opening for the rod, as shown by dotted lines in Figs. 4 and 5, and as the vertical movement of the rod is necessarily as little as the thickness of a sheet of paper, the slots in parts 63 and 60ᵃ need be no more than the loose fitting of the rod therein.

After each shaft 30 and its markers have been swept over the table and sheet and the lines made, the reverse movement is begun by turning the knob 32 and the bar when the markers will be lifted from the sheet and the bearing 25 slid along the rail back to the starting point. The partial rotation of the shaft will throw the roller 33 under the outer end of the shaft and elevate the same with the eccentric 31 and remove all the markers from the sheet.

The mounting of the table 20 is shown in Fig. 15 where a portable stand 66 is shown having casters to move the whole device about a floor and on which the said table is pivoted and adapted to be tipped at any desired angle when the brace 67 is released. The table itself is braced to prevent sagging or bulging by the angle iron 68 on the under side thereof and as shown in Fig. 16 and by dotted lines in Fig. 1 and arranged diagonally from one corner to another and secured by bolts 69 attached to the outer ends of the rails 21 and 22 and that pass through slots 70 in the board to allow for contraction and expansion.

A modified arrangement of the means for operating the rods 57 and 58 is shown in Figs. 9, 10, 11 and 12 where the end of each rod is reduced to receive and carry a crank arm 78 having a handle 79 and the reduced end plays in the slot 80 of the standard 81 and on the inner side of the standard the rod has secured to it the member 82 of the toggle levers 82 and 83, the latter being pivoted on the pin 84 at the lower end of the standard. A tension spring 85 hung on the reduced end of the rod 57 and the pin 84 draws the said rod and the clamps 56 downward but when the handle and crank arm 78 are lowered the toggle members, moving in unison by being connected, are brought end to end and the rod 57 is elevated so that the sheet may be located beneath the clamps.

For accuracy in locating the markers, beam callipers such as shown in Figs. 17, 18 and 19 may be used and consist of a graduated beam 86 having adjustable stops 87 held in place on the beam by means of the clamping levers 88, each having a tooth on its outer end and which bears against the upper edge of the beam until released by the button at the free end of the lever. Sufficient friction is provided against the lever 88 within the stop to insure the retention in either its locking or its released position. The tops of the rings 39 may have lateral grooves cut therein and into the same the beam may be dropped and the unlocated ring brought as far towards the located ring as the stop will permit. In this manner very delicate adjustment of the markers may be secured, particularly when the machine is located in a dark corner or room, and desired positions secured for the markers.

The inking rollers 48 are of felt or similar absorbent material and to be saturated with a liquid ink. Serious inconvenience will result in the evaporation of the ink while the machine is inoperative and to prevent this loss of material the rollers may be removed from the machine each night or holiday and deposited in the tube 89 as shown in Fig. 20. Both the bottom 90 and the cap 91 of this receptacle are conical and the spindle 92 readily locates in the apex of both ends and holds the roller from contact with the tube and the hermetically closed cap prevents the loss of liquid.

When a sheet of paper is placed on the table and held at its two sides by the clamps 56, as above described, the shafts 30 and the markers may be successively run over the same and the appropriate marks made thereon by the ink from the wheels 43.

The above operation provides for the lining of one side of a sheet of paper while the reverse side is left blank but it is very evident that the machine may also be made to produce lines on the reverse side also by the use of carbon or impression paper under the sheet, or ink may be dispensed with and the carbon paper used on either side of the sheet to produce the lines.

While the device shown and above described is capable of performing this operation very readily it is obvious that the parts may be otherwise arranged or modified without departing from the essential features of the invention or from the scope of the appended claims.

What I claim as new is:—

1. In a lining up machine, the combination of a table, rails at the sides of the same, shafts each having one of its ends supported on one of the rails, and adapted to slide along the said rail, and an adjustable roller at the other end of each of the shafts.

2. In a lining up machine, the combination of a table, rails at the sides of the same, a slidable bearing on each rail, a shaft eccentrically journalled at one end in each bearing, an arm at the other end of each shaft, and a roller at the end of each arm and adapted to support the shaft at that end.

3. In a lining up machine, the combination of a stand, a pivoted table, rails at the sides of the same, a bearing having a flat base adapted to slide along each rail, a shaft carrying markers and eccentrically mounted at one end in each bearing, a roller supporting each shaft at its other end, and a knob at the eccentric end of the shaft to rotate the same and to slide the bearing.

4. In a lining up machine, the combination of a table having tracks at its sides, bearings with slidable bases and adapted to be moved in contact with the tracks, shafts journalled at one end in the bearings, markers adjustable along the shafts, and means for adjusting the axes of the shafts vertically.

5. In lining up machines, the combination of a table having tracks at two adjacent sides and meeting at one corner, a brace beneath the table and connecting the outer ends of said tracks, slidable bearings on the tracks shafts journalled at one of their ends in the bearings, markers adjustable on the shafts, and a supporting roller at the other end of each shaft.

6. In a lining-up machine, the combination of a table having tracks along its sides, a diagonal brace connecting the sides, bearings adapted to slide along the tracks, shafts eccentrically journalled in the bearings, markers adjustable along the shafts and supporting rollers at the ends of the shafts.

7. In a lining up machine, the combination of a table having tracks at its sides, flanges at one side of each track, gauges having clamping extensions adapted to fit on the flanges, slidable bearings on the tracks and guided by the flanges, shafts carried by the bearings, and markers hung from the shafts.

8. In a lining up machine, the combination of a table having tracks at its sides and a brace connecting the said tracks, gauges carried on the tracks, bearings slidable on the tracks, shafts each having one end eccentrically journalled in a bearing, a roller adjustable at one end of each shaft, markers on the shafts, and knobs on the shafts adjacent the bearings and adapted to turn the shafts and change the position of the markers.

9. In a lining up machine, the combination of a table, bearings having bases adapted to slide on the table, shafts each having an eccentric end journalled in a bearing, a roller supporting the other end of each shaft, an inclined arm carrying each roller, markers adjustable along the shafts, and knobs adapted to turn the shafts and lift the markers.

10. In a lining up machine, the combination of a table having rails at its sides, bearings with bases adapted to slide on the rails, shafts eccentrically mounted at one end in the bearings, an adjustable arm at the other end of each of said shafts, a roller carried by the arm, and a knob at the eccentrically mounted end of each shaft and adapted to rotate the same and to move the bearing.

11. In a lining up machine, the combination of a table, rails at the sides of said table, a flange and guide strip on each rail, a bearing on each rail having a base to slide between the flange and the strip, a shaft with an eccentric portion journalled at one end in each of the bearings, a roller mounted eccentrically at the other end of each shaft, markers adapted to be shifted on each shaft, and spring pressed detents to hold the markers.

12. In a lining up machine, the combination of a table, side rails having guiding means, bearing members with bases adapted to slide in the guiding means, a shaft mounted at one end eccentrically in each bearing member, an eccentrically mounted roller at the other end of each shaft, spring held markers adjustable along the shafts, and means adapted for simultaneously sliding the bearings and lifting the markers from operation.

13. In a lining-up machine, the combination of a table, rails at the edges of the same, guide means on the rails, journal boxes adapted to slide in the guide means, gauges carried by the guide means, eccentrics mounted at one end in the journal boxes, shafts extending from the eccentrics, eccentric rollers at the other ends of the shafts, slotted carrying arms for adjustably holding the rollers, and a knob at the outside of the eccentrics.

14. In a lining up machine, the combination of a table having rails at its edges, a flange at the inner side of each rail, a guide strip near the outer side of each rail, a brace on the under side of the table, screws passing through slots in the table and connecting the braces at the outer ends of the rails, a shaft journalled to slide on each rail and between the flange and the guide strip, markers on the shaft, gauges mounted on the flanges, and rods carrying clamps adjacent the flanges.

15. In a lining-up machine, the combination of a table having rails at two adjacent edges and having flanges along their inner sides, a guide strip on the rails and parallel with the flanges, a journal box with a sliding base for each rail, gauges with hooks to attach them to the flanges, clamping rods carried by the flanges, clamps on the same and means for raising the clamping rods.

16. In a lining-up machine, the combination of a table, rails on the same and having a flange on their inner edges, gauges with spring fingers to fit over the flanges, slotted uprights at the ends of the rails, a bar carrying clamps and located in the uprights, and means for elevating the bar.

17. In a lining-up machine, the combination of a table, rails having flanges and located at the edges of the table, gauges adapted to be hung on the flanges, clamping members, rods carrying the latter, slotted uprights through which the rods pass, cams on the rods, and handles to operate the cams and raise the rods and clamps.

18. In a lining-up machine, the combination of a table having flanges near its edges, gauges adapted to be held on the flanges, uprights at the ends of the flanges, rods supported by the uprights, clamping members carried by the rods and guided by the flanges, connecting means between the rods, and means for simultaneously raising the rods.

19. In a lining-up machine, the combination of a diagonally braced table, rails along adjacent edges of the table, journal boxes adapted to slide on the rails, shafts eccentrically journalled in the boxes, means for moving the shafts vertically, marker rings adjustable along the bar, spring detents holding the markers on the shaft, marking wheels below the shaft and carried by the rings, brackets depending from the shaft, an inking roller in the brackets, and a smoothing roller at the ends of the brackets having a spiral groove.

20. In a lining-up machine, the combination of rails located on adjacent edges of a table, bearings adapted to slide in the rails, hollow adjustable shafts journalled at one of their ends in the bearings, and a filling of porous material in the shaft.

21. In a lining up machine, the combination of a portable table sliding bearings on adjacent edges of the table, reinforced shafts eccentrically mounted at one end in the bearings and having a longitudinal groove, a wooden core in the shaft, an arm at the other end of each shaft and carrying a roller, marker rings having arms and adjustable on the shafts, spring pressed detents engaging the grooves of the shafts, marker wheels on said arms, and means permitting reversing of the wheels on the same arms.

22. In a lining up machine, the combination of a movable table of bearing boxes adapted to be moved along the edges of the table, hollow reinforced shafts each having a longitudinal groove and mounted eccentrically at one end in a bearing, an adjustable support for the other end of each shaft, markers comprising a ring and a wheel and adjustably mounted on each shaft, a swivelled yoke carried below each ring and supporting the wheel, an inking roller hung adjacent the marker wheels, and a smoothing roller carried by each shaft to move in advance of the wheels.

23. In a lining-up machine, the combination of a table, a series of rails along the adjacent sides of the table, journal boxes adapted to slide on the rails, shafts eccentrically journalled in the boxes, rings carried by the shafts, marking wheels swivelled on the rings, and means for holding the wheels in reversed positions on the rings.

24. In a lining up machine, the combination of a table, rails along the adjacent sides of the table, a metal shaft with a wooden core and eccentrically journalled to slide along each rail, rings adjustable on the shaft, arms on the rings and having sockets, yokes with stems swivelled in the sockets, marker wheels journalled in the yokes, and springs adapted to depress the wheels.

25. In a lining up machine, the combination of a table shafts adapted to be mounted at right angles to each other and across the table, rings adapted to be adjusted and held at desired positions along the shafts, yokes swivelled in the rings, hubs with trunnions carried in the yokes, a wheel journalled in each hub, and an inking roller impinging the wheels of each shaft.

26. In a lining up machine, the combination of a table movable bearing boxes adapted to slide on rails along the sides of the table, gauges adjacent the rails, clamps beside the rails, eccentrically mounted shafts in the bearings, rings adapted to be adjusted along the shafts, spring detents to hold the rings, means for elevating the clamps, reversible marking wheels swivelled to the rings, brackets depending from the shafts, an inking roller carried by the brackets of each shaft, and a smoothing roller having a spiral groove and carried by the brackets of each shaft.

In testimony whereof, I have signed my name to this specification in the presence of two subscribing witnesses, this 14th day of December, 1919.

MARK N. CORMACK.

Witnesses:
O. U. BAKER,
JAMES F. DUHAMEL.